(12) United States Patent
Hayashida et al.

(10) Patent No.: US 10,136,772 B2
(45) Date of Patent: Nov. 27, 2018

(54) TOILET SEAT AND METHOD OF MANUFACTURING A TOILET SEAT

(71) Applicant: TOTO LTD., Kitakyushu-shi, Fukuoka (JP)

(72) Inventors: Takeshi Hayashida, Kitakyushu (JP); Nobuhiko Umeda, Kitakyushu (JP); Hideaki Toma, Kitakyushu (JP)

(73) Assignee: TOTO LTD., Kitakyushu-shi (JP)

( * ) Notice: Subject to any disclaimer, the term of this patent is extended or adjusted under 35 U.S.C. 154(b) by 0 days.

(21) Appl. No.: 15/264,668

(22) Filed: Sep. 14, 2016

(65) Prior Publication Data
US 2017/0071423 A1 Mar. 16, 2017

(30) Foreign Application Priority Data
Sep. 16, 2015 (JP) .................................. 2015-183135

(51) Int. Cl.
| | |
|---|---|
| *A47K 13/02* | (2006.01) |
| *A47K 13/30* | (2006.01) |
| *B29C 41/20* | (2006.01) |
| B29C 45/14 | (2006.01) |
| B29K 23/00 | (2006.01) |
| B29K 55/02 | (2006.01) |
| B29L 31/00 | (2006.01) |
| F16B 11/00 | (2006.01) |

(52) U.S. Cl.
CPC ............ *A47K 13/02* (2013.01); *A47K 13/305* (2013.01); *B29C 41/20* (2013.01); *B29C 45/14475* (2013.01); *B29K 2023/12* (2013.01); *B29K 2055/02* (2013.01); *B29L 2031/7694* (2013.01); *F16B 11/006* (2013.01)

(58) Field of Classification Search
CPC ..... A47K 13/02; A47K 13/305; A47K 13/307
See application file for complete search history.

(56) References Cited

U.S. PATENT DOCUMENTS

2014/0223652 A1* 8/2014 Jin ...................... B29C 45/0017
4/237

* cited by examiner

*Primary Examiner* — Janie Loeppke
(74) *Attorney, Agent, or Firm* — Amin, Turocy & Watson LLP

(57) ABSTRACT

A toilet seat includes a body, a bottom plate, and a joining member. The body includes a seating part and a side wall part. The side wall part extends from each of an inner end and an outer end of the seating part. The bottom plate includes a bottom plate part and a protrusion part. The bottom plate part and the seating part face each other. The protrusion part protrudes laterally from the bottom plate part and is configured to be pressed by an end of the side wall part. The joining member joins the body and the bottom plate. The joining member is formed of a filling material poured to closely contact a side surface of the bottom plate part and a non-pressing surface other than a surface pressing the protrusion part on the end of the side wall part.

4 Claims, 9 Drawing Sheets

FIG.1
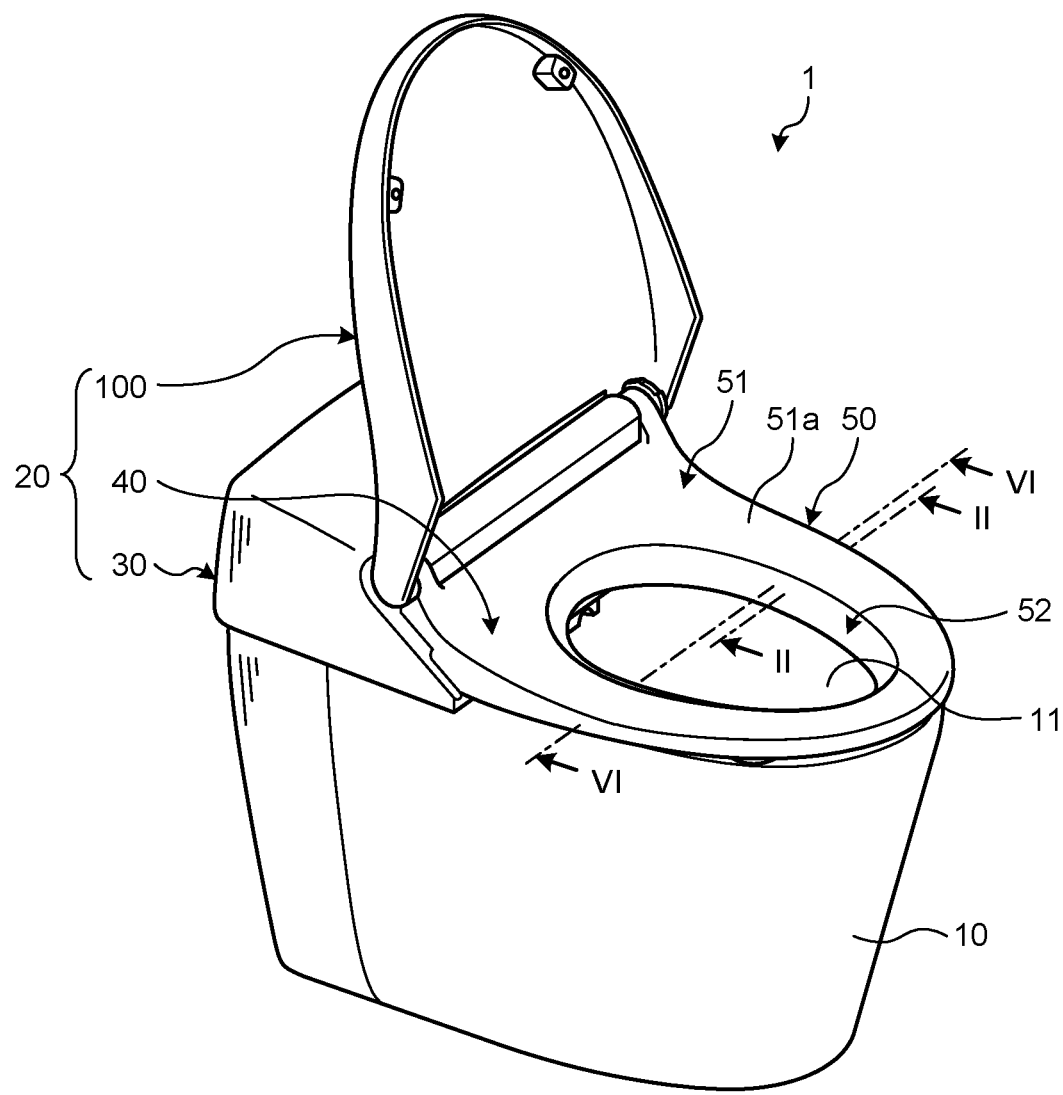
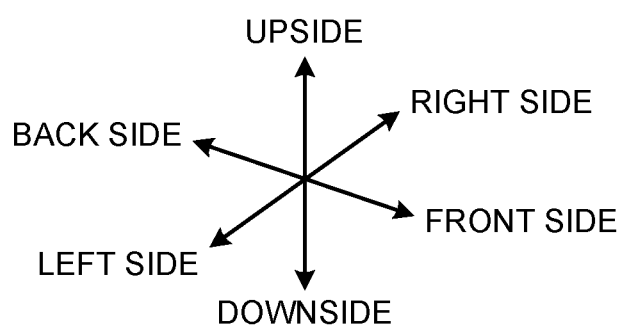

TOILET SEAT AND METHOD OF MANUFACTURING A TOILET SEAT

CROSS-REFERENCE TO RELATED APPLICATION

This application is based upon and claims the benefit of priority from the prior Japanese Patent Application No. 2015-183135, filed on Sep. 16, 2015, the entire contents of which are incorporated by reference.

FIELD

An embodiment of the disclosure relates to a toilet seat and a method of manufacturing a toilet seat.

BACKGROUND

Conventionally, a toilet seat includes a body member that has a seating part that supports buttocks of a user, and a bottom plate member that has a bottom plate part that is disposed to be opposite to the seating part. For a method of manufacturing a toilet seat as described above, for example, a technique has been known for molding a body member and a bottom plate member by using a die and joining the molded body member and bottom plate member.

In a toilet seat as described above, a slight groove is generated on a joining portion between a body member and a bottom plate member. Accordingly, dirt, dust, or the like may accumulate on such a groove to spoil aesthetic appearance of a toilet seat. In recent years, a technique is proposed for pouring a molten filling material into a groove between a body member and a bottom plate member to fill and plug the groove therewith (see, for example, Japanese Laid-open Patent Publication No. 10-276935).

However, a body member and a bottom plate member may contract after molding thereof. Accordingly, in a conventional technique, for example, as a molten filling material is poured into a groove in a state where a body member and a bottom plate member are held in a die, the molten filling material may also flow into a gap between the members, a gap between the die and the members, or the like, that is generated by contraction as described above. Thus, there is room for improvement in a conventional technique as described above in that a molten filling material is appropriately poured into a groove between a body member and a bottom plate member.

SUMMARY

A toilet seat according to an embodiment includes a body, a bottom plate, and a joining member. The body includes a seating part and a side wall part, wherein the side wall part extends from each of an inner end and an outer end of the seating part. The bottom plate includes a bottom plate part and a protrusion part, wherein the bottom plate part and the seating part face each other, and the protrusion part protrudes laterally from the bottom plate part and is configured to be pressed by an end of the side wall part. The joining member joins the body and the bottom plate, wherein the joining member is formed of a filling material poured to closely contact a side surface of the bottom plate part and a non-pressing surface other than a surface pressing the protrusion part on the end of the side wall part.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 1 is a perspective view illustrating a toilet apparatus that includes a toilet seat according to a first embodiment;

DESCRIPTION OF EMBODIMENTS

Figure 2:
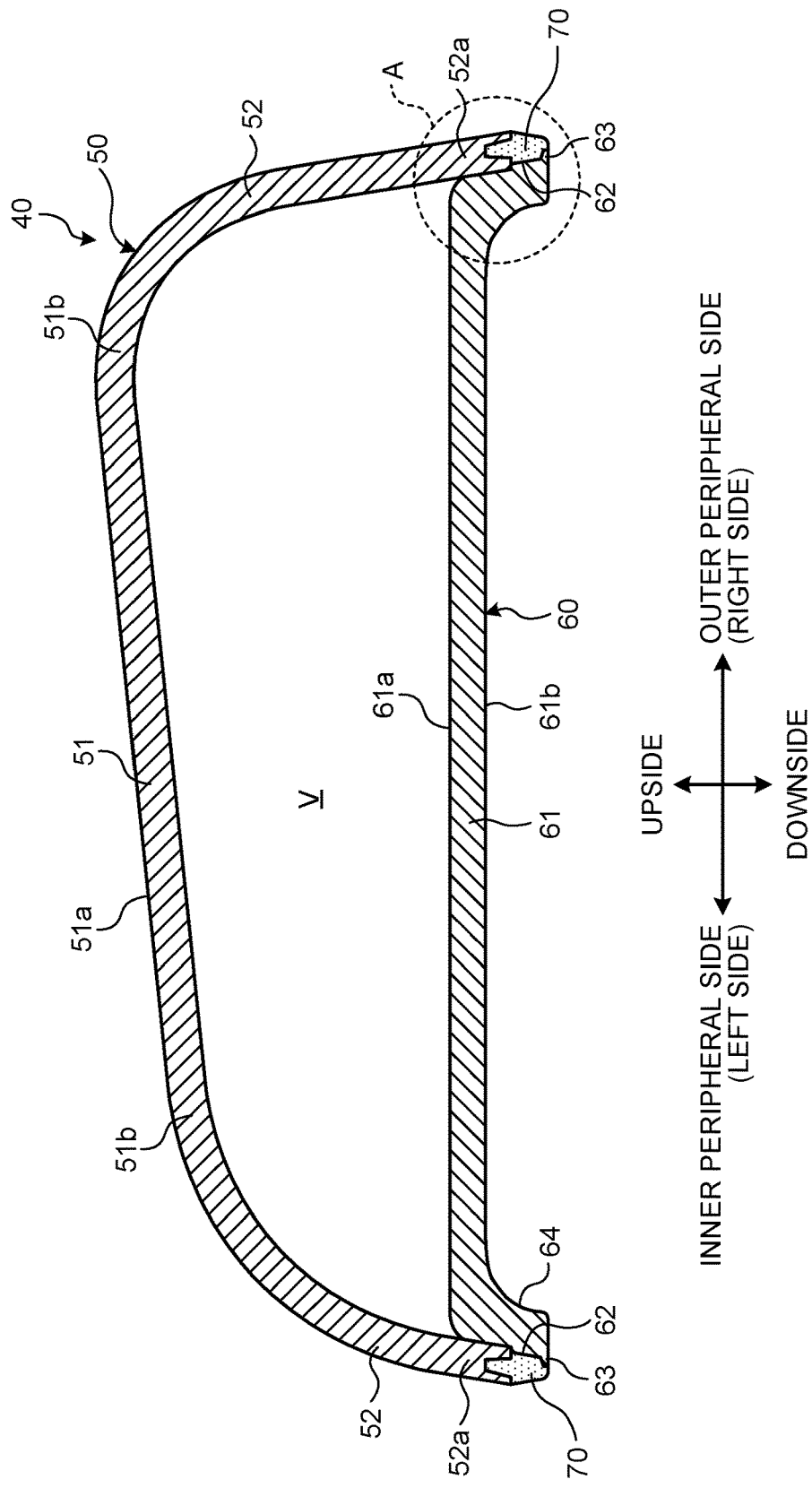
FIG. 2 is an end view along a line II-II in FIG. 1.

Hereinafter, embodiments of a toilet seat and a method of manufacturing a toilet seat as disclosed in the present application will be described in detail, with reference to the accompanying drawings. This invention is not limited to embodiments as described below.

First Embodiment

FIG. 1 is a perspective view illustrating a toilet apparatus that includes a toilet seat according to a first embodiment. As illustrated in FIG. 1, a toilet apparatus 1 includes a Western-style toilet bowl (that will be described as a "toilet" below) 10 and a sanitary washing device 20. In an example as illustrated in FIG. 1, a floor-mounted type toilet 10 is illustrated and this is not limiting, where a wall-mounted type or the like may be provided.

The sanitary washing device 20 is mounted on an upside of the toilet 10 and washes a private part of a user. In the present specification, a vertically upward direction and a vertically downward direction may be described as an "upside" and a "downside", respectively, for readily understanding the description. A front side, a back side, a right side, and a left side when viewed from a user that faces to the toilet 10 and stands in front of the toilet 10 may be described as a "front side", a "back side", a "right side", and a "left side", respectively.

The sanitary washing device 20 includes a body part 30, a toilet seat 40, and a toilet lid 100. A washing nozzle is housed in the body part 30 so as to be movable forward and backward relative to the body part 30, although illustration thereof is omitted. A washing nozzle moves forward into a bowl part 11 of the toilet 10 and discharges hot or cold water to a body of a user to wash a private part thereof, according to an operation instruction of the user. In the above description, the sanitary washing device 20 includes a washing function to wash a private part of a user and this is not limiting, where a configuration that does not include a washing function may be provided.

Each of the toilet seat 40 and the toilet lid 100 is supported by a shaft so as to be openable and closable with respect to the body part 30. The toilet seat 40 will be described with reference to FIG. 2 and subsequent drawings.

FIG. 2 is an end view along a line II-II in FIG. 1. FIG. 2 only illustrates the toilet seat 40 and illustration of the toilet 10 or the like is omitted. Hereinafter, an expression that indicates a direction, such as an "upside" or a "downside", means an "upside" or a "downside" in a state where seating is possible on the toilet seat 40, that is, a state where it is left down as illustrated in FIG. 1, and this is provided for a purpose of illustration and does not limit, for example, a direction in a state where the toilet seat 40 is left up.

As illustrated in FIG. 2, the toilet seat 40 includes a body member 50 with a user being seated thereon, a bottom plate member 60 that is located on a downside of the body member 50, and a joining member 70 that joins the body member 50 and the bottom plate member 60. The toilet seat 40 is formed into a hollow shape that has an internal space V.

A heating part for warming buttocks of a user, such as a heater, is disposed in the internal space V and illustration thereof is omitted in FIG. 2 for simplification of the drawing. For materials of the body member 50, the bottom plate member 60, and the joining member 70, for example, a resin such as a polypropylene can be used. A material of the body member 50 or the like is not limited to the above and may be, for example, another material such as an Acrylonitrile-Butadiene-Styrene (ABS) resin. Materials of the body member 50, the bottom plate member 60, and the joining member 70 are not required to be identical.

As will be described later in detail, the body member 50 and the bottom plate member 60 as described above are molded by using a die and the molded body member 50 and bottom plate member 60 are joined to manufacture the toilet seat 40.

As the body member 50 and the bottom plate member 60 are joined, a slight groove is generated on a joining portion, and hence, dirt, dust, or the like may accumulate on such a groove during use of the toilet seat 40 to spoil aesthetic appearance of the toilet seat 40. Accordingly, in the present embodiment, a molten filling material is poured into such a groove to fill and plug the groove therewith, so that aesthetic appearance of the toilet seat 40 is improved, and the body member 50 and the bottom plate member 60 are joined due to solidification of such a filling material. The joining member 70 is a solidified filling material.

However, the body member 50 and the bottom plate member 60 may contract after molding thereof. Accordingly, in a conventional technique, for example, as a molten filling material is poured into a groove in a state where a body member and a bottom plate member are held in a die, the molten filling material may also flow into a gap between the members, a gap between the die and the members, or the like, that is generated by contraction as described above.

Hence, the toilet seat 40 according to the present embodiment is configured in such a manner that a filling material can appropriately be poured into a gap between the body member 50 and the bottom plate member 60. Hereinafter, such a configuration will be described in detail.

As illustrated in FIG. 2, the body member 50 includes a seating part 51 and a side wall part 52. The seating part 51 has a ring shape in a top view (see FIG. 1) and is formed in a plate shape, and buttocks of a non-illustrated user are supported by a top surface 51*a* thereof. The seating part 51 is formed into a ring shape as described above, and hence, a left side and a right side in FIG. 2 may be described as an "inner peripheral side" and an "outer peripheral side", respectively, below.

The side wall part 52 is provided to extend from each of an inner peripheral side and an outer peripheral side of the seating part 51 toward a downside thereof. In other words, the side wall part 52 is formed so as to curve and hang from an end edge 51*b* on each of an inner peripheral side and an outer peripheral side of the seating part 51.

The side wall part 52 on an outer peripheral side and the side wall part 52 on an inner peripheral side are each formed to slope in such a manner that a separation distance gradually increases toward a lower end part 52*a* thereof. A detail of a configuration of the side wall part 52 will be described later by using FIG. 3 or the like.

The bottom plate member 60 includes a bottom plate part 61, a protrusion part 62, and an extension part 63. The bottom plate part 61 is formed into a ring shape in a top view (not seen in FIG. 1) and a plate shape, similarly to the seating part 51. The bottom plate part 61 is disposed on a downside of the seating part 51 so as to be opposite to the seating part 51. Namely, the bottom plate part 61 and the seating part 51 face each other.

For the bottom plate part 61, a recess 64 is formed on a bottom surface 61*b* on an opposite side of a top surface 61*a* that is opposite to the seating part 51. Thereby, a thickness of the bottom plate part 61 in upward and downward directions can be reduced as compared with a case where the recess 64 is not formed, so that weight reduction of the toilet seat 40 can be attained. In the above description, the recess 64 is formed on the bottom plate part 61 and this is not limiting, where a configuration may be provided in such a manner that the recess 64 is not formed.

Figure 3:
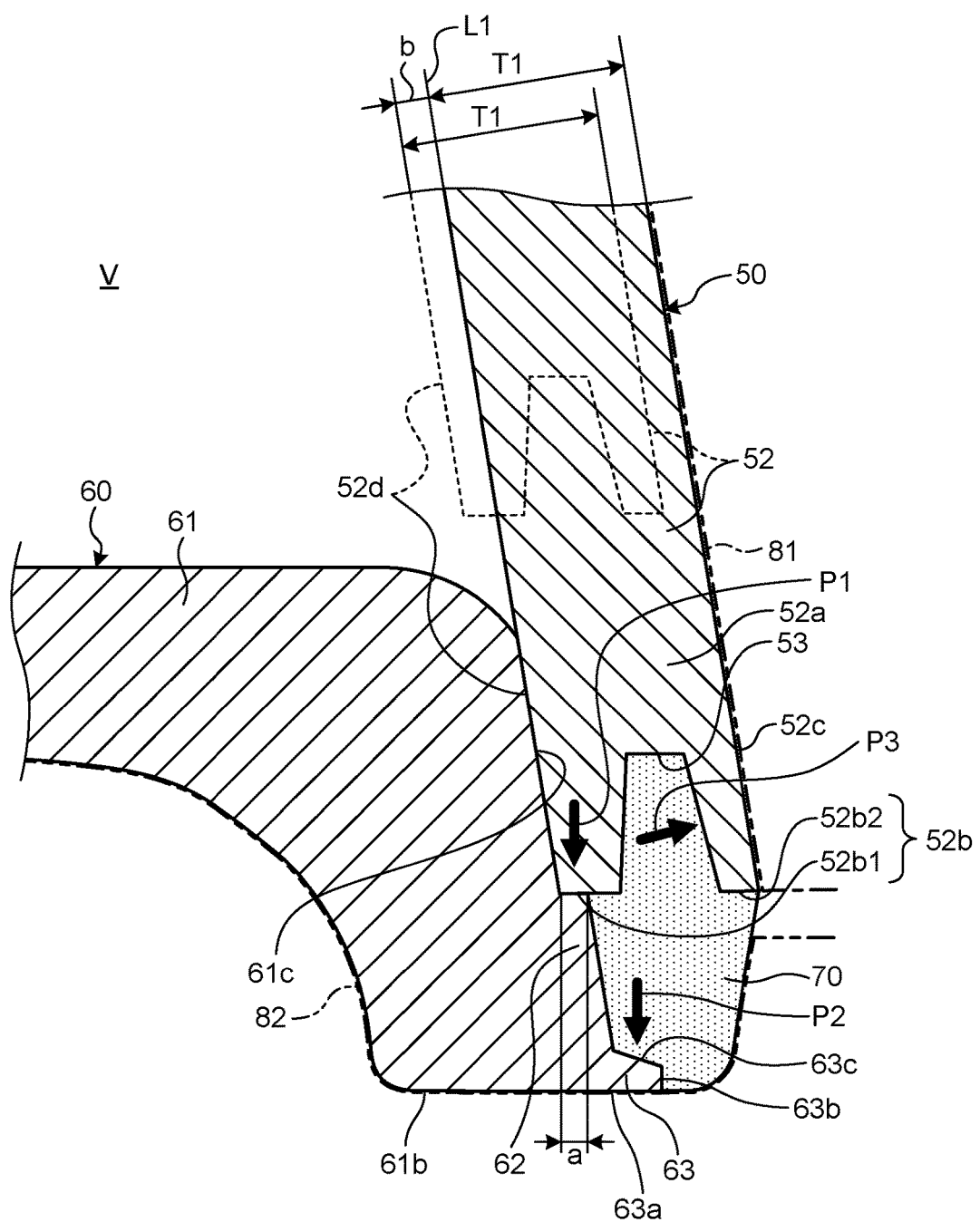
FIG. 3 is an enlarged view illustrating a neighborhood of a joining portion between a body member and a bottom plate member of a toilet seat.

FIG. 3 is an enlarged view illustrating a neighborhood of a joining portion between the body member 50 and the bottom plate member 60 on an outer peripheral side of the toilet seat 40, and specifically, is an enlarged view illustrating a portion surrounded by a broken closed curve A in FIG. 2.

Hereinafter, a configuration of the bottom plate part 61 or the side wall part 52 on an outer peripheral side of the toilet seat 40 will be described as an example, and the following description also generally applies to the bottom plate part 61 or the side wall part 52 on an inner peripheral side thereof. That is, the bottom plate part 61 or the side wall part 52 is formed so as to be substantially bilaterally symmetric on an outer peripheral side and an inner peripheral side. Therefore, a description for the bottom plate part 61 or the side wall part 52 on an inner peripheral side will be omitted.

As illustrated in FIG. 3, the protrusion part 62 is provided to protrude laterally from a side surface 61*c* of the bottom plate part 61. A distance a of lateral protrusion of the protrusion part 62 from the bottom plate part 61 is settable at an any value. Herein, "lateral or laterally" is not limited to a "right side" or a "left side" as illustrated in FIG. 1 or FIG. 2 and is used as a meaning of "lateral or laterally" in a case of a cross sectional view of the bottom plate part 61.

Thus, the bottom plate member 60 includes the protrusion part 62, so that a step can be provided on the side surface 61*c* of the bottom plate part 61. The protrusion part 62 is pressed by an end surface 52*b* of the side wall part 52 as indicated by an arrow P1. That is, even in a case where the body member 50 or the bottom plate member 60 contracts after molding thereof, the end surface 52*b* of the side wall part 52 and the protrusion part 62 are pressed by and contact one another so as not to provide a gap therebetween.

Thereby, for example, at a time of formation of the joining member 70 as described later, a molten filling material can be prevented from penetrating and flowing into the internal space V through a gap between the end surface 52*b* of the side wall part 52 and the protrusion part 62. As a result, a filling material can appropriately be poured into a groove between the body member 50 and the bottom plate member 60.

As the body member 50 and the bottom plate member 60 are fitted with one another as described later, the end surface 52b of the side wall part 52 presses the protrusion part 62 and thereby the protrusion part 62 functions as a stopper, so that positioning of the body member 50 relative to the bottom plate member 60 in upward and downward directions can also be executed.

The extension part 63 is provided to extend laterally along the bottom surface 61b of the bottom plate part 61. In detail, the extension part 63 is formed in such a manner that a bottom surface 63a thereof is provided in a plane identical to or a plane substantially identical to the bottom surface 61b of the bottom plate part 61, and is provided to extend laterally. Thereby, at a time of formation of the joining member 70, a molten filling material can be prevented from flowing into a downside of the bottom surface 61b of the bottom plate part 61.

Herein, for convenience of understanding, a die that is used at a time of formation of the joining member 70 is indicated by a virtual line in FIG. 3. Specifically, in FIG. 3, a first die 81 that holds the body member 50 at a time of formation of the joining member 70 is indicated by a dashed-dotted virtual line and a second die 82 that holds the bottom plate member 60 is indicated by a dashed-two-dotted virtual line. A specific configuration of the first or second die 81 or 82 will be described later by using FIG. 6.

As described above, the bottom plate member 60 includes the extension part 63, and hence, at a time of formation of the joining member 70, a filling pressure of a molten filling material also acts on the extension part 63 in a direction of pressing against the second die 82 (see an arrow P2). That is, even in a case where the body member 50 or the bottom plate member 60 contracts after molding thereof, the bottom surface 63a of the extension part 63 and the second die 82 are pressed by and contact one another so as not to provide a gap therebetween. Thereby, at a time of formation of the joining member 70, a molten filling material can be prevented from flowing into a downside of the bottom surface 61b of the bottom plate part 61.

The extension part 63 is formed in such a manner that a thickness thereof is reduced toward a distal end 63b thereof. Thereby, the extension part 63 can readily be deformed due to a filling pressure as described above. Therefore, the bottom surface 63a of the extension part 63 and the second die 82 are pressed by and contact one another so as not to provide a gap therebetween more reliably, due to deformation of the extension part 63, and thereby, a molten filling material can effectively be prevented from flowing into a downside of the bottom surface 61b of the bottom plate part 61.

A direction P1 of pressing of the protrusion part 62 by the end surface 52b of the side wall part 52 is a direction that is substantially identical to a direction P2 of pressing of the extension part 63 against the second die 82. Therefore, the bottom surface 63a of the extension part 63 and the second die 82 are also pressed by and contact one another so as not to provide a gap therebetween, due to a pressure of the side wall part 52 against the protrusion part 62, and hence, a molten filling material can be prevented from flowing into a downside of the bottom surface 61b of the bottom plate part 61 more reliably.

The side wall part 52 is configured in such a manner that a portion of the end surface 52b presses the protrusion part 62. That is, the end surface 52b of the side wall part 52 can be divided into a surface 52b1 that presses the protrusion part 62 and a non-pressing surface 52b2 other than the surface 52b1.

A groove part 53 is formed on the non-pressing surface 52b2 of the side wall part 52 as described above. The groove part 53 is formed along a peripheral direction of the toilet seat 40. Thereby, at a time of formation of the joining member 70, a molten filling material can be prevented from flowing into a side of an outer wall 52c of the side wall part 52.

That is, the body member 50 includes the groove part 53, and hence, at a time of formation of the joining member 70, a molten filling material flows into the groove part 53. Accordingly, a filling pressure of a filling material that flows into the groove part 53 also acts on the side wall part 52 in a direction of pressing against the first die 81 (see an arrow P3). Therefore, even in a case where the body member 50 or the like contracts after molding thereof, the outer wall 52c of the side wall part 52 and the first die 81 are pressed by and contact one another so as not to provide a gap therebetween. Thereby, at a time of formation of the joining member 70, a molten filling material can be prevented from flowing into a side of the outer wall 52c of the side wall part 52.

The side wall part 52 and the bottom plate part 61 are formed in such a manner that an inner wall 52d of the side wall part 52 and an outer wall (that is the side surface 61c herein and may be described as an "outer wall 61c" below) of the bottom plate part 61 are pressed by and contact one another.

Specifically, for example, a thickness T1 of the side wall part 52 is set (or the side wall part 52 has a thickness T1) in such a manner that, as the body member 50 and the bottom plate member 60 are fitted with one another as described later, the inner wall 52d of the side wall part 52 and the outer wall 61c of the bottom plate part 61 are pressed by and contact one another and the body member 50 and the bottom plate member 60 are fitted with one another (or the bottom plate member 60 is fitted into the body member 50). Herein, the thickness T1 of the side wall part 52 means a thickness in a direction perpendicular to the inner wall 52d that contacts the outer wall 61c of the bottom plate part 61.

For readily understanding a setting of the thickness T1 of the side wall part 52 as described above, the side wall part 52 before its fitting with the bottom plate member 60 is indicated by a broken line in FIG. 3. In a case where a line that virtually extends the outer wall 61c of the bottom plate part 61 in a upward direction is referred to as a "virtual extended line L1" as illustrated in FIG. 3, the thickness T1 of the side wall part 52 is set so as to be a predetermined distance b greater than the virtual extended line L1 toward a side of the outer wall 61c of the bottom plate part 61. The predetermined distance b is settable at any value.

Figure 4:
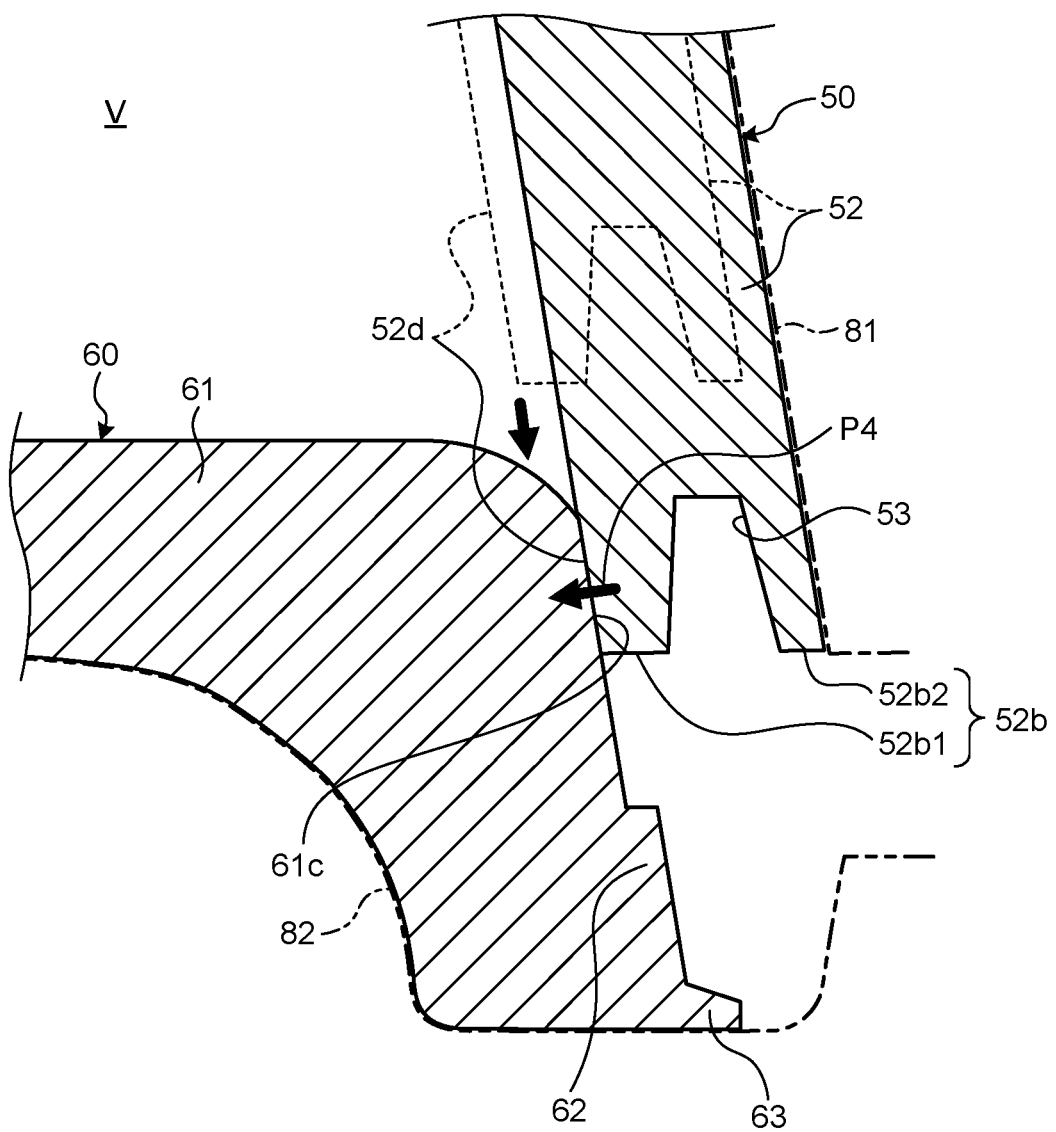
FIG. 4 is a diagram illustrating a situation where a body member and a bottom plate member are fitted with one another.

As the side wall part 52 with the thickness T1 set as described above is moved downwardly in order to fit the body member 50 and the bottom plate member 60 with one another, the side wall part 52 moves while a pressure (see an arrow P4) acts on the outer wall 61c of the bottom plate part 61 as illustrated in FIG. 4. FIG. 4 is a diagram illustrating a situation where the body member 50 and the bottom plate member 60 are fitted with one another.

Thereby, in a state where the body member 50 and the bottom plate member 60 are fitted with one another as illustrated in FIG. 3, the inner wall 52d of the side wall part 52 and the outer wall 61c of the bottom plate part 61 are pressed by and contact one another. That is, even in a case where the body member 50 or the bottom plate member 60 contracts after molding thereof, the inner wall 52*d* of the side wall part 52 and the outer wall 61*c* of the bottom plate part 61 are pressed by and contact one another so as not to provide a gap therebetween.

Thereby, for example, at a time of formation of the joining member 70, a molten filling material can be prevented from penetrating and flowing into the internal space V through a gap between the inner wall 52*d* of the side wall part 52 and the outer wall 61*c* of the bottom plate part 61. Accordingly, the joining member 70 that is a solidified filling material is provided in a state where it does not reach (or flow into) the internal space V formed (or defined) by the body member 50 and the bottom plate member 60.

The joining member 70 joins the body member 50 and the bottom plate member 60 that are configured as described above. Specifically, the joining member 70 is formed by a filling material that is poured so as to closely contact the non-pressing surface 52*b*2 of the side wall part 52, the side surface 61*c* of the bottom plate part (that is a side surface of the protrusion part 62 in detail), and a surface 63*c* other than the surface (bottom surface) 63*a* along the bottom surface 61*b* of the bottom plate part 61 on the extension part 63.

Thus, the joining member 70 closely contacts the side wall part 52 of the body member 50, the bottom plate part 61 of the bottom plate member 60, or the like, so that the body member 50 and the bottom plate member 60 can be joined tightly.

The body member 50 includes the groove part 53, and hence, the body member 50 and the bottom plate member 60 can be joined more tightly. That is, a molten filling material is also poured into and solidified in the groove part 53, and hence, the joining member 70 is also formed in the groove part 53. Thereby, a contact area between the joining member 70 and the body member 50 can be increased as compared with a case where the groove part 53 is not included, and hence, the body member 50 and the bottom plate member 60 can be joined more tightly.

A groove between the body member 50 and the bottom plate member 60 is plugged with the joining member 70, and hence, aesthetic appearance of the toilet seat 40 can be improved.

Next, a method of manufacturing the toilet seat 40 according to the first embodiment will be described. The toilet seat 40 according to the first embodiment is manufactured by, for example, injection molding that uses die slide injection.

Figure 5:
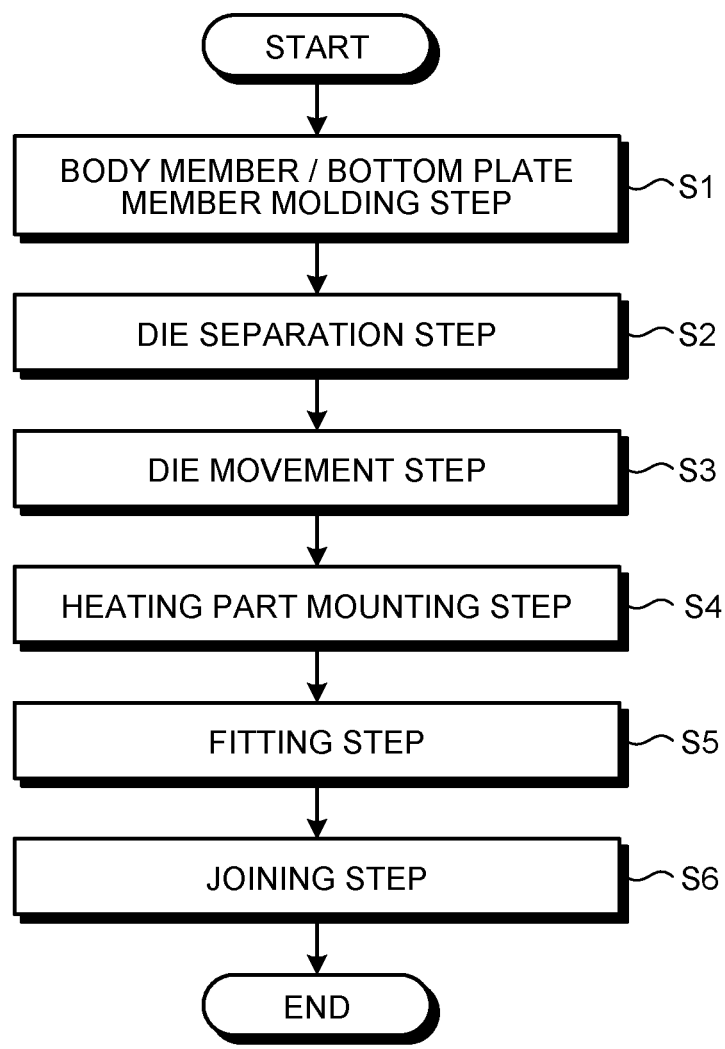
FIG. 5 is a flowchart illustrating main steps of a method of manufacturing a toilet seat.
Figure 6:
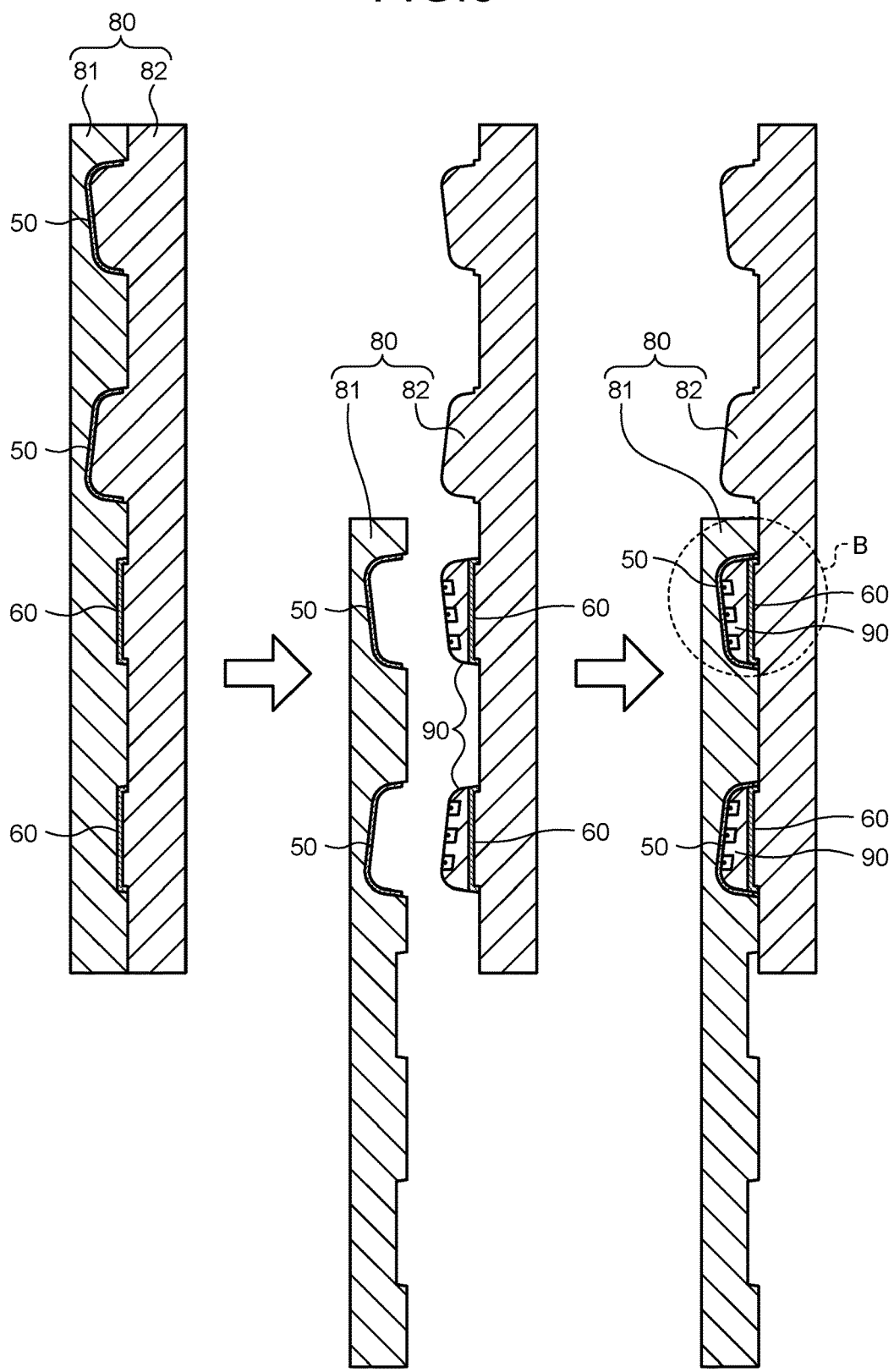
FIG. 6 is a schematic cross-sectional view of a toilet seat and a die for illustrating steps for manufacturing a toilet seat.

FIG. 5 is a flowchart illustrating main steps of a method of manufacturing the toilet seat 40 according to the first embodiment. FIG. 6 is a schematic cross-sectional view of the toilet seat 40 and a die 80 for illustrating steps for manufacturing the toilet seat 40. In FIG. 6, a portion that corresponds to the toilet seat 40 cut along a line VI-VI in FIG. 1 is illustrated and illustration of the protrusion part 62 or the like is omitted for simplification of the drawing.

As illustrated in FIG. 5, in steps for manufacturing the toilet seat 40, a body member/bottom plate member molding step is first executed that molds the body member 50 and the bottom plate member 60 by using a die 80 (step S1). As illustrated in a left view of FIG. 6, the die 80 includes a first die 81 that is a concave die and a second die 82 that is a convex die that corresponds to the first die 81, and can mold the body member 50 and the bottom plate member 60 at once.

Specifically, the first die 81 and the second die 82 are superposed to one another, and subsequently, a molten resin is poured between the first die 81 and the second die 82, so that the body member 50 and the bottom plate member 60 are injection-molded.

In the body member/bottom plate member molding step, a thickness T1 (see FIG. 3) of the side wall part 52 is set in such a manner that the inner wall 52*d* of the side wall part 52 and the outer wall 61*c* of the bottom plate part 61 are pressed by and contact one another and the body member 50 and the bottom plate member 60 are fitted with one another in a fitting step as described below.

Then, a die separation step that separates the first die 81 and the second die 82 is executed (step S2). In the die separation step, separation between the first die 81 and the second die 82 is executed while the body member 50 is held in the first die 81 and the bottom plate member 60 is held in the second die 82. For example, holding of the body member 50 in the first die 81 and holding of the bottom plate member 60 in the second die 82 may be executed by fitting of the dies 81 and 82 with one another or may be executed by utilizing an air pressure.

Then, a die movement step that moves the first die 81 and the second die 82 (relatively) is executed (step S3). In the die movement step, as illustrated in a middle view of FIG. 6, the first die 81 is moved in such a manner that the body member 50 held in the first die 81 and the bottom plate member 60 held in the second die 82 are opposite to one another (or face each other). In an example as illustrated in FIG. 6, the first die 81 is moved and this is not limiting, where the second die 82 may be moved or both of the first and second dies 81 and 82 may be moved.

Figure 7:
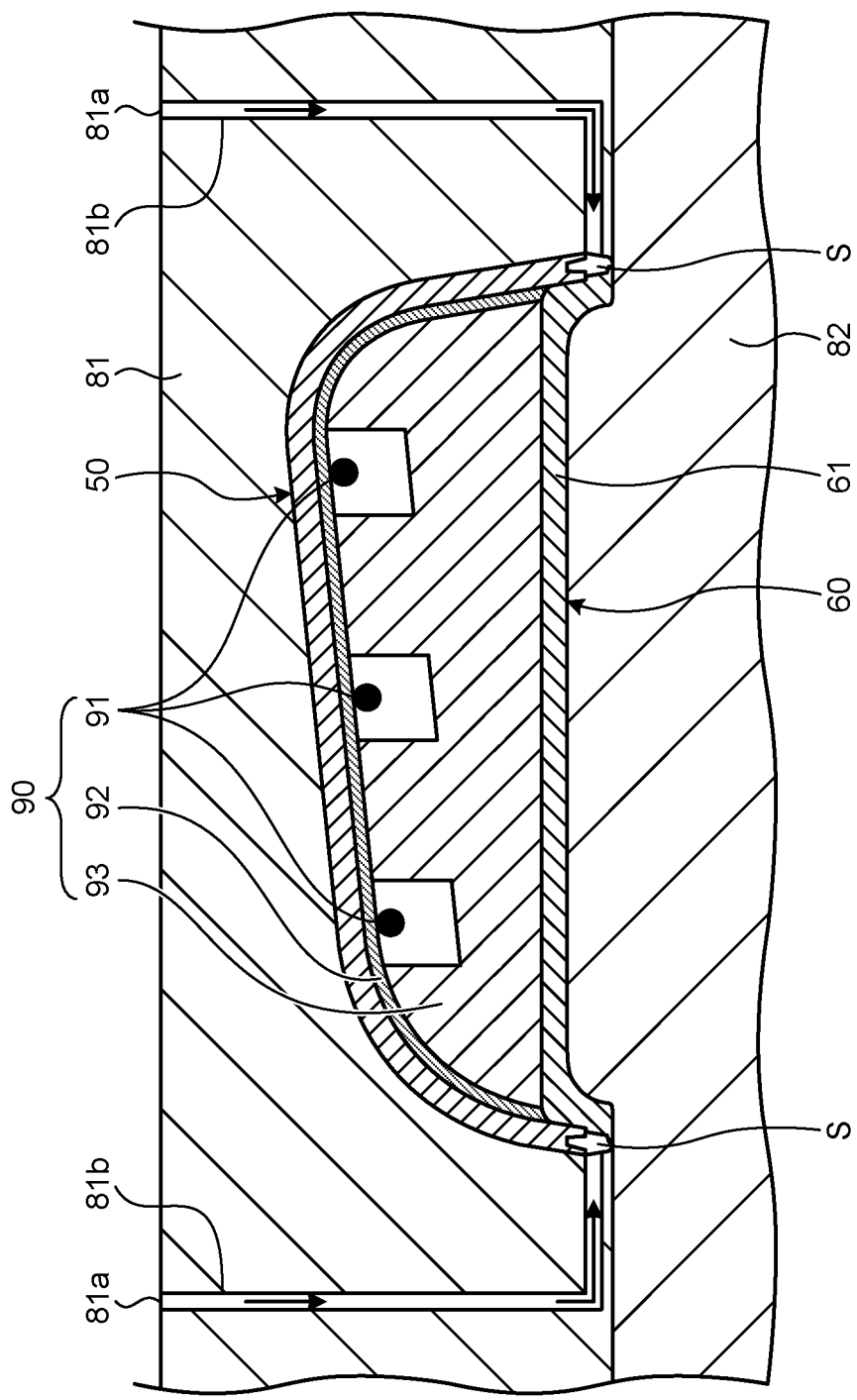
FIG. 7 is a diagram for illustrating a joining step.

Then, a heating part mounting step that mounts a heating part 90 on the bottom plate member 60 is executed (step S4, see a middle view of FIG. 6). In an example as illustrated in FIG. 6, the heating part 90 is mounted on the bottom plate member 60 and this is not limiting, where it may be mounted on the body member 50. As illustrated in FIG. 7 that will be described later, the heating part 90 includes a heating element 91 such as a heater, a heat conductor 92 that is located so as to contact the body member 50, and a heat insulation material 93 that is located so as to contact the bottom plate member 60, and a configuration of the heating part 90 is not limited thereto.

Then, a fitting step that superposes the first die 81 and the second die 82 on one another in such a manner that the body member 50 and the bottom plate member 60 are fitted with one another (the bottom plate member 60 is fitted into the body member 50) (step S5, see a right view of FIG. 6). In the fitting step, for example, the first die 81 is moved toward the second die 82. Thereby, as described with reference to FIG. 4, the side wall part 52 of the body member 50 moves while a pressure (see the arrow P4) acts on the outer wall 61*c* of the bottom plate part 61.

As illustrated in FIG. 3, positioning of the body member 50 is executed in a state where the inner wall 52*d* of the side wall part 52 and the outer wall 61*c* of the bottom plate part 61 are pressed by and contact one another and the body member 50 and the bottom plate member 60 are fitted with one another so that the end surface 52*b* of the side wall part 52 presses the protrusion part 62. Thus, in the fitting step, the end surface 52*b* of the side wall part 52 presses the protrusion part 62 and the body member 50 and the bottom plate member 60 are fitted with one another. In the above description, the first die 81 is moved and this is not limiting, where the second die 82 may be moved or both of the first and second dies 81 and 82 may be moved.

Then, a joining step that joins the body member 50 and the bottom plate member 60 is executed (step S6). FIG. 7 is a diagram for illustrating a joining step, and specifically, is an enlarged view illustrating a portion surrounded by a broken closed curve B in FIG. 6.

As illustrated in FIG. 7, an injection hole 81a and a flow passage 81b are formed in the first die 81. The injection hole 81a is a hole for injecting a molten filling material thereinto. The flow passage 81b communicates with the injection hole 81a and a groove S between the body member 50 and the bottom plate member 60. For a molten filling material, for example, a molten resin can be used. Illustration of the injection hole 81a and the flow passage 81b as described above is omitted in FIG. 6 or the like.

In the joining step, a molten filling material is poured into the groove S through the injection hole 81a and the flow passage 81b. Specifically, the groove S is a space defined by the side wall part 52 of the body member 50, the bottom plate part 61 of the bottom plate member 60, and the first and second dies 81 and 82.

In detail, in the joining step, a filling material is poured between the first die 81 and the second die 82 so as to closely contact the non-pressing surface 52b2 of the side wall part 52, the side surface 61c of the bottom plate part 61, and the surface 63c other than the surface (bottom surface) 63a along the bottom surface 61b of the bottom plate part 61 on the extension part 63 (see FIG. 3).

Then, in the joining step, a molten filling material is solidified to form the joining member 70, and hence, the body member 50 and the bottom plate member 60 are joined by the joining member 70. In the above description, the first die 81 includes the injection hole 81a and the flow passage 81b, and this is not limiting, where a configuration may be provided in such a manner that the second die 82 includes an injection hole and a flow passage.

The die 80 is opened after the joining step is ended, and thereby, the toilet seat 40 is completed, although illustration thereof is omitted.

As has been described above, the toilet seat 40 according to the first embodiment includes the body member 50, the bottom plate member 60, and the joining member 70 that joins the body member 50 and the bottom plate member 60. The body member 50 has the seating part 51 that supports buttocks of a user and the side wall part 52 that is provided to extend from each of an inner peripheral side and an outer peripheral side of the seating part 51. The bottom plate member 60 has the bottom plate part 61 that is disposed to be opposite to the seating part 51 and the protrusion part 62 that is provided to protrude laterally from the bottom plate part 61 and pressed by the end surface 52b of the side wall part 52. The joining member 70 is formed of a filling material poured to closely contact the non-pressing surface 52b2 other than the surface 52b1 that presses the protrusion part 62 on the end surface 52b of the side wall part 52, and the side surface 61c of the bottom plate part 61.

Thereby, for example, even in a case where the body member 50 or the like contracts after molding thereof, the end surface 52b of the side wall part 52 and the protrusion part 62 are pressed by and contact one another so as not to provide a gap therebetween. Therefore, at a time of formation of the joining member 70, a filling material can be prevented from penetrating and flowing into the internal space V of the toilet seat 40 through a gap between the end surface 52b of the side wall part 52 and the protrusion part 62, and as a result, the filling material can appropriately be poured into the groove S between the body member 50 and the bottom plate member 60. A filling material is poured into and fills the groove S so as to plug the groove therewith, so that aesthetic appearance of the toilet seat 40 can be improved.

For example, as the body member 50 and the bottom plate member 60 are fitted with one another, the end surface 52b of the side wall part 52 presses the protrusion part 62, so that positioning of the body member 50 relative to the bottom plate member 60 can also be executed.

Second Embodiment

Next, a second embodiment will be described. In the following description, a part similar to a part having been described already will be provided with a sign identical to that of the part having been described already and a redundant description thereof will be omitted.

Figure 8:
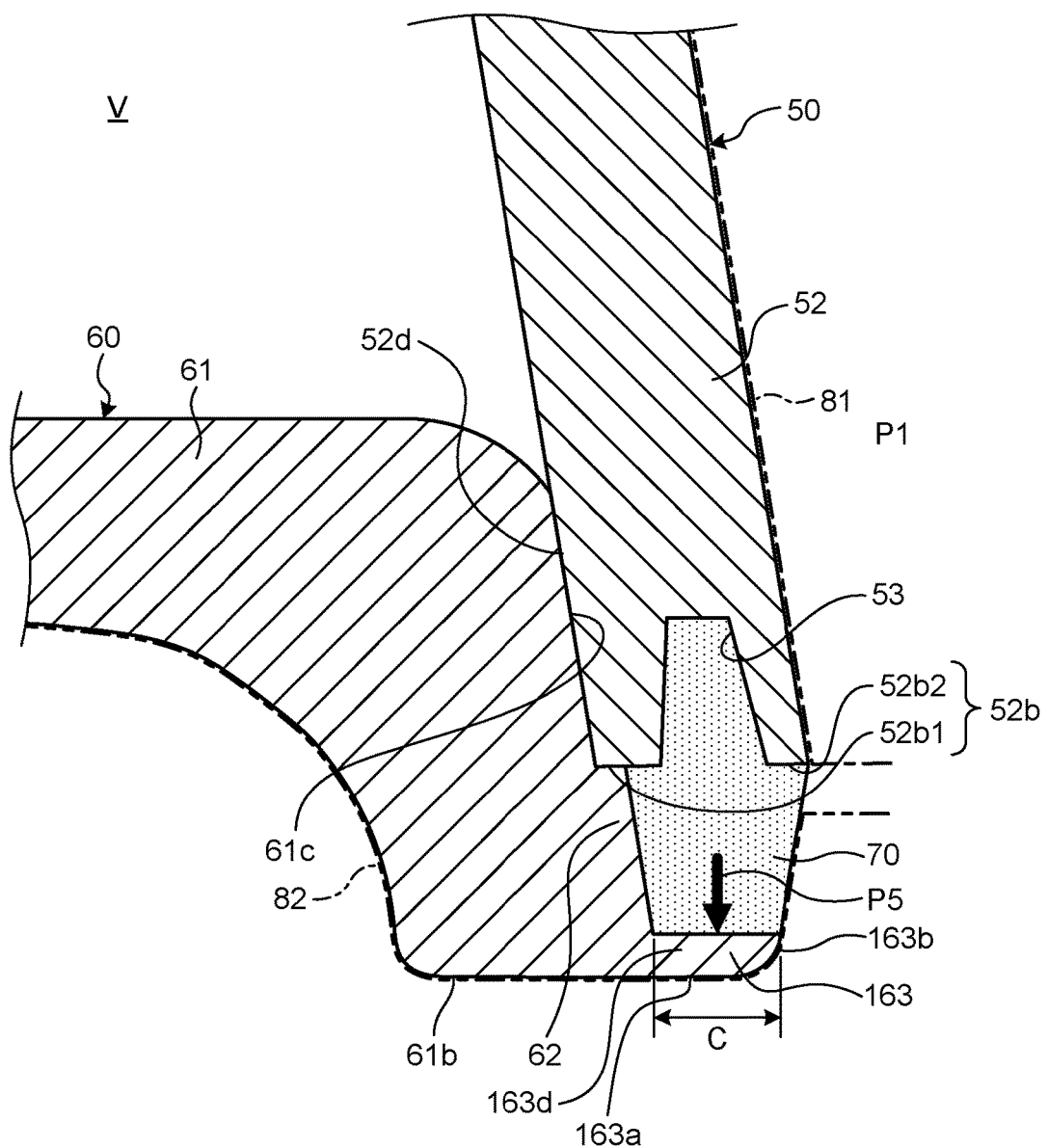
FIG. 8 is an enlarged view illustrating a neighborhood of a joining portion between a body member and a bottom plate member of a toilet seat according to a second embodiment.

FIG. 8 is an enlarged view illustrating a neighborhood of a joining portion between the body member 50 and the bottom plate member 60 on an outer peripheral side of the toilet seat 40 according to the second embodiment. As illustrated in FIG. 8, the second embodiment is configured in such a manner that a shape of an extension part 163 is different from a shape of the extension part 63 in the first embodiment.

Specifically, the extension part 163 of the bottom plate member 60 is formed in such a manner that a distance c from the side surface 61c of the bottom plate part 61 to a distal end 163b thereof is extended and the distal end 163b reaches the second die 82 or a neighborhood of the second die 82. That is, the distance c of the extension part 163 is set in such a manner that the joining member 70 is not formed on a side of a bottom surface of the toilet seat 40, and specifically, is formed so as not to reach a plane identical to the bottom surface 61b of the bottom plate part 61.

Thereby, at a time of formation of the joining member 70, it is possible to increase a contact area between the extension part 163 and a molten filling material, and hence, a filling pressure (see an arrow P5) in a direction of pressing against the second die 82 that acts on the extension part 163 can be increased.

That is, even in a case where the body member 50 or the bottom plate member 60 contracts after molding thereof, a bottom surface 163a of the extension part 163 and the second die 82 are pressed by and contact one another so as not to provide a gap therebetween. Thereby, at a time of formation of the joining member 70, a molten filling material can be prevented from flowing into a downside of the bottom surface 61b of the bottom plate part 61.

In an example as illustrated in FIG. 8, a thickness of the extension part 163 is uniform or substantially uniform from an proximal end 163d thereof to the distal end 163b and this is not limiting, wherein it may be formed in such a manner that its thickness is reduced toward the distal end 163b.

Third Embodiment

Next, a third embodiment will be described. Although the thickness T1 of the side wall part 52 in the first embodiment as described above is set in such a manner that the inner wall 52d of the side wall part 52 and the outer wall 61c of the bottom plate part 61 are pressed by and contact one another, a "thickness of a bottom plate part" is set in the third embodiment.

Figure 9:
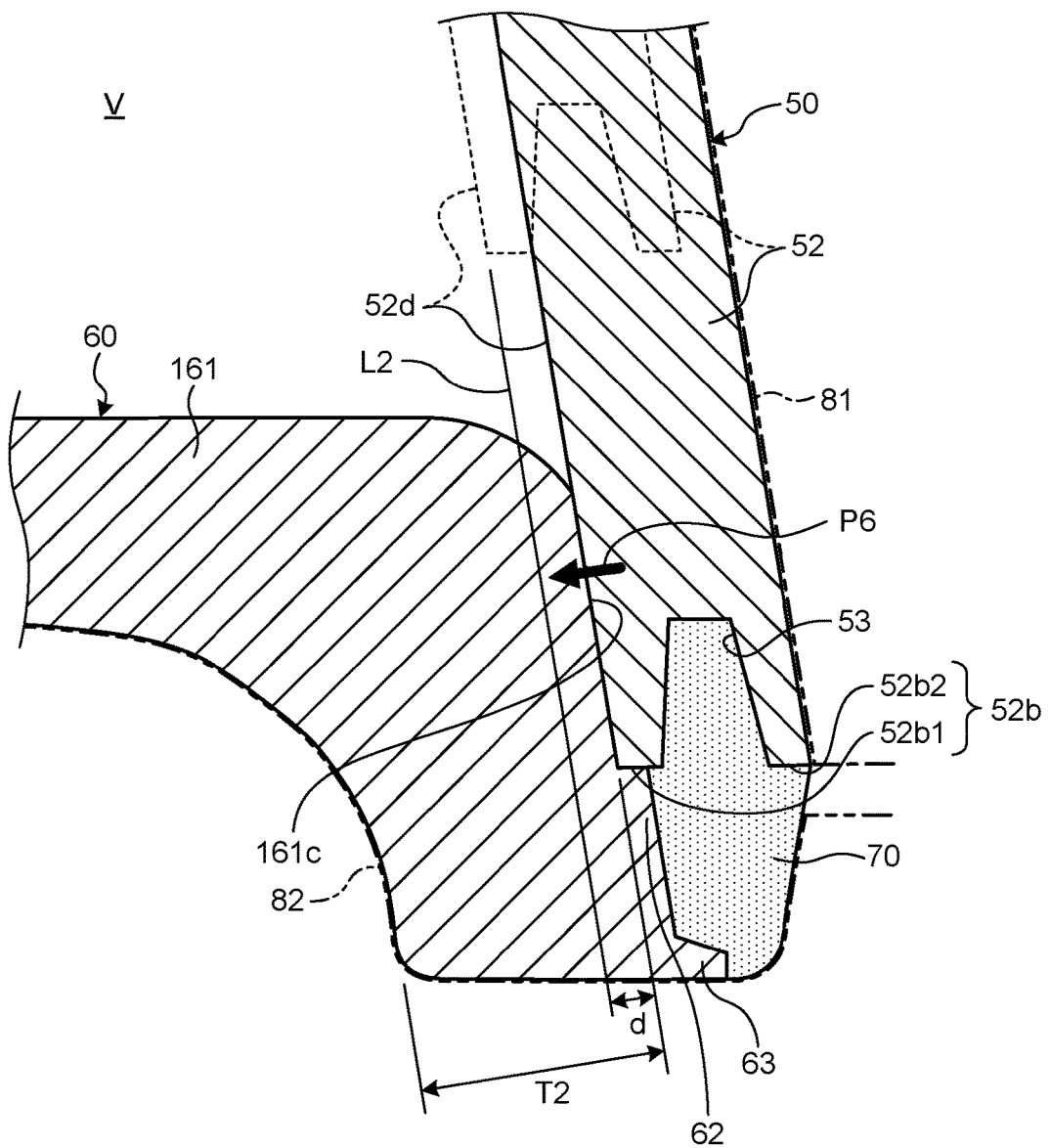
FIG. 9 is an enlarged view illustrating a neighborhood of a joining portion between a body member and a bottom plate member of a toilet seat according to a third embodiment.

FIG. 9 is an enlarged view illustrating a neighborhood of a joining portion between the body member 50 and the bottom plate member 60 on an outer peripheral side of the toilet seat 40 according to the third embodiment. As illustrated in FIG. 9, as the body member 50 and the bottom plate member 60 are fitted with one another, a thickness T2 of a bottom plate part 161 is set (or a bottom plate part 161 has a thickness T2) in such a manner that the inner wall 52d of the side wall part 52 and an outer wall 161c of the bottom plate part 161 are pressed by and contact one another and the body member 50 and the bottom plate member 60 are fitted with one another (or the bottom plate member 60 is fitted into the body member 50). Herein, the thickness T2 of the bottom plate part 161 means a thickness thereof in a direction perpendicular to the outer wall 161c that contacts the inner wall 52d of the side wall part 52.

For readily understanding setting of the thickness T2 of the bottom plate part 161 as described above, the side wall part 52 before fitting with the bottom plate member 60 is indicated by a broken line in FIG. 9. As illustrated in FIG. 9, in a case where a line provided by virtually extending the inner wall 52d of the side wall part 52 in a downward direction is referred to as a "virtual extended line L2", the thickness T2 of the bottom plate part 161 is set so as to be a predetermined distance d greater than the virtual extended line L2 toward a side of the inner wall 52d of the side wall part 52. The predetermined distance d is settable at any value.

As the side wall part 52 before fitting thereof is moved downwardly in order to fit the body member 50 and the bottom plate member 60 with one another, the side wall part 52 moves while a pressure (see an arrow P6) acts on the outer wall 161c of the bottom plate part 161 that has the thickness T2 set as described above, although illustration thereof is omitted.

Thereby, the inner wall 52d of the side wall part 52 and the outer wall 161c of the bottom plate part 161 are pressed by and contact one another in a state where the body member 50 and the bottom plate member 60 are fitted with one another. A point that, by such pressing and contacting, a molten filling material can be prevented from penetrating and flowing into the internal space V through a gap between the inner wall 52d of the side wall part 52 and the outer wall 161c of the bottom plate part 161 is similar to that of the first embodiment.

The body member/bottom plate member molding step in a method of manufacturing the toilet seat 40 according to the third embodiment is different from that of the first embodiment. That is, in the body member/bottom plate member molding step in the third embodiment, the thickness T2 of the bottom plate part 161 is set in such a manner that the inner wall 52d of the side wall part 52 and the outer wall 161c of the bottom plate part 161 are pressed by and contact one another and the body member 50 and the bottom plate member 60 are fitted with one another in the fitting step.

The protrusion part 62, the extension part 63, the groove part 53, or the like is formed along a complete periphery of the toilet seat 40 in the embodiments as described above, is not limited thereto, and may be formed along a portion thereof.

The bottom plate part 61 or the side wall part 52 is formed so as to be substantially bilaterally symmetric on an outer peripheral side and an inner peripheral side of the toilet seat 40 in the above description, is not limited thereto, and may have different shapes between the outer peripheral side and the inner peripheral side. For example, a shape of the bottom plate part 61 or the side wall part 52 on an identical outer peripheral side may be different depending on a position, such as a front side or a back side, of the toilet seat 40.

The toilet seat 40 is illustrated as an O-type in a top view in the above description, is not limited thereto, and may be, for example, a U-type with a substantially ring shape and a partially notched front side thereof.

The toilet seat 40 includes the heating part 90 in the above description, is not limited thereto, and may be configured not to include the heating part 90. In such a case, the heating part mounting step or the step S4 can be omitted in the flowchart in FIG. 5.

According to an aspect of an embodiment as described above, a toilet seat includes a body member, a bottom plate member, and a joining member. The body member has a seating part that supports buttocks of a user and a side wall part that is provided to extend from each of an inner peripheral side and an outer peripheral side of the seating part. The bottom plate member has a bottom plate part that is disposed to be opposite to the seating part and a protrusion part that is provided to protrude laterally from the bottom plate part and pressed by an end surface of the side wall part. The joining member joins the body member and the bottom plate member and is formed of a filling material that is poured to closely contact a non-pressing surface other than a surface that presses the protrusion part on the end surface of the side wall part, and a side surface of the bottom plate part.

Thereby, for example, even in a case where a body member or a bottom plate member contracts after molding thereof, an end surface of a side wall part and a protrusion part are pressed by and contact one another so as not to provide a gap therebetween. Therefore, a filling material can be prevented from penetrating and flowing into an internal space of a toilet seat through a gap between an end surface of a side wall part and a protrusion part at a time of formation of a joining member, and as a result, the filling material can appropriately be poured into a groove between a body member and a bottom plate member. A filling material is poured into such a groove, and thereby, the groove is filled and plugged therewith, so that aesthetic appearance of a toilet seat can be improved.

For example, as a body member and a bottom plate member are fitted with one another, an end surface of a side wall part presses a protrusion part, so that positioning of the body member with respect to the bottom plate member can also be executed.

The bottom plate member has an extension part that is provided to extend laterally along a bottom surface of the bottom plate part. The joining member is formed of a filling material that is poured to closely contact the non-pressing surface of the side wall part, the side surface of the bottom plate part, and a surface other than a surface along the bottom surface of the bottom plate part on the extension part.

Thereby, for example, at a time of formation of a joining member, a filling pressure of a filling material also acts on an extension part in a direction of pressing against a die. That is, for example, even in a case where a body member or a bottom plate member contracts after molding thereof, a bottom surface of an extension part and a die are pressed by and contact one another so as not to provide a gap therebetween. Therefore, at a time of formation of a joining member, a filling material can be prevented from flowing to a downside of a bottom surface of a bottom plate part.

The extension part is formed in such a manner that a thickness thereof is reduced toward a distal end thereof. Thereby, an extension part can readily be deformed by a filling pressure of a filling material. Therefore, for example, a bottom surface of an extension part and a die are pressed by and contact one another so as not to provide a gap therebetween more reliably, due to deformation of the extension part, and thereby, a filling material can effectively be prevented from flowing to a downside of a bottom surface of a bottom plate part.

The body member has a groove part that is formed on the non-pressing surface of the side wall part. Thereby, for example, at a time of formation of a joining member, a filling pressure of a filling material also acts on a side wall part in a direction of pressing against a die. That is, even in a case where a body member or the like contracts after molding thereof, an outer wall of a side wall part and a die are pressed by and contact one another so as not to provide a gap therebetween. Therefore, at a time of formation of a joining member, a filling material can be prevented from flowing to an outer wall side of a side wall part.

The side wall part and the bottom plate part are formed in such a manner that an inner wall of the side wall part and an outer wall of the bottom plate part are pressed by and contact one another. The joining member does not reach an internal space that is formed by the body member and the bottom plate member.

Thereby, for example, even in a case where a body member or a bottom plate member contracts after molding thereof, an inner wall of a side wall part and an outer wall of a bottom plate part are pressed by and contact one another so as not to provide a gap therebetween. Therefore, at a time of formation of a joining member, a filling material can be prevented from penetrating and flowing into an internal space through a gap between an inner wall of a side wall part and an outer wall of a bottom plate part.

A method of manufacturing a toilet seat includes a body member/bottom plate member molding step, a die separation step, a die movement step, a fitting step, and a joining step. The body member/bottom plate member molding step is to pour a molten resin between a first die and a second die to mold a body member that has a seating part that supports buttocks of a user and a side wall part that is provided to extend from each of an inner peripheral side and an outer peripheral side of the seating part and a bottom plate member that has a bottom plate part that is disposed to be opposite to the seating part and a protrusion part that is provided to protrude laterally from the bottom plate part. The die separation step is to separate the first die and the second die while the body member is held in the first die and the bottom plate member is held in the second die. The die movement step is to move the first die and the second die relatively in such a manner that the body member and the bottom plate member are opposite to one another. The fitting step is to superpose the first die and the second die to one another in such a manner that the protrusion part is pressed by an end surface of the side wall part and the body member and the bottom plate member are fitted with one another. The joining step is to pour a filling material between the first die and the second die to closely contact a non-pressing surface other than a surface that presses the protrusion part on the end surface of the side wall part, and a side surface of the bottom plate part, and thereby, join the body member and the bottom plate member.

Thereby, for example, even in a case where a body member or the like contracts after molding thereof, an end surface of a side wall part and a protrusion part are pressed by and contact one another so as not to provide a gap therebetween, in a fitting step. Therefore, a filling material can be prevented from penetrating and flowing into an internal space of a toilet seat through a gap between an end surface of a side wall part and a protrusion part in a joining step, and as a result, the filling material can appropriately be poured into a groove between a body member and a bottom plate member. A filling material is poured into such a groove, and thereby, the groove is filled and plugged therewith, so that aesthetic appearance of a toilet seat can be improved.

For example, in a fitting step, an end surface of a side wall part presses a protrusion part, so that positioning of a body member with respect to a bottom plate member can also be executed. In a fitting step, an end surface of a side wall part presses a protrusion part, for example, so that a bottom plate member and a second die are pressed by and contact one another so as not to provide a gap therebetween, and hence, in a joining step, a filling material can be prevented from flowing to a downside of a bottom surface of a bottom plate part.

The body member/bottom plate member molding step is to provide an extension part to extend laterally along a bottom surface of the bottom plate part in the bottom plate member. The joining step is to pour a filling material between the first die and the second die to closely contact the non-pressing surface of the side wall part, the side surface of the bottom plate part, and a surface other than a surface along the bottom surface of the bottom plate part on the extension part.

Thereby, for example, in a joining step, a filling pressure of a filling material also acts on an extension part in a direction of pressing against a second die. That is, for example, even in a case where a body member or the like contracts after molding thereof, a bottom surface of an extension part and a second die are pressed by and contact one another so as not to provide a gap therebetween. Therefore, in a joining step, a filling material can be prevented from flowing to a downside of a bottom surface of a bottom plate part.

The body member/bottom plate member molding step is to set a thickness of the side wall part in such a manner that an inner wall of the side wall part and an outer wall of the bottom plate part are pressed by and contact one another and the body member and the bottom plate member are fitted with one another in the fitting step.

Thereby, for example, even in a case where a body member or the like contracts after molding thereof, an inner wall of a side wall part and an outer wall of a bottom plate part are pressed by and contact one another so as not to provide a gap therebetween in a fitting step. Therefore, in a joining step, a filling material can be prevented from penetrating and flowing into an internal space through a gap between an inner wall of a side wall part and an outer wall of a bottom plate part.

The body member/bottom plate member molding step is to set a thickness of the bottom plate part in such a manner that an inner wall of the side wall part and an outer wall of the bottom plate part are pressed by and contact one another and the body member and the bottom plate member are fitted with one another in the fitting step.

Thereby, for example, even in a case where a body member or the like contracts after molding thereof, an inner wall of a side wall part and an outer wall of a bottom plate part are pressed by and contact one another so as not to provide a gap therebetween in a fitting step. Therefore, in a joining step, a filling material can be prevented from penetrating and flowing into an internal space through a gap between an inner wall of a side wall part and an outer wall of a bottom plate part.

According to an aspect of an embodiment, a filling material can appropriately be poured into a groove between a body member and a bottom plate member in a toilet seat and aesthetic appearance thereof can be improved.

Additionally, the "body member" as described above and the "bottom plate member" as described above may be referred to as a "body" and a "bottom plate", respectively. Furthermore, the "inner peripheral side" as described above and the "outer peripheral side" as described above may be referred to as an "inner end" and an "outer end", respectively. The "end surface" as described above may be referred to as an "end". The "groove part" as described above may be referred to as a "groove". The "outer wall" as described above may be referred to as an "outer peripheral wall".

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A toilet seat, comprising:
   a body including a seating part and a side wall part, the side wall part extending from each of an inner end and an outer end of the seating part;
   a bottom plate including a bottom plate part and a protrusion part, the bottom plate part and the seating part facing each other, and the protrusion part protruding laterally from the bottom plate part and being configured to be pressed by an end of the side wall part; and
   a joining member joining the body and the bottom plate, the joining member being formed of a filling material poured to closely contact a side surface of the bottom plate part and a non-pressing surface other than a surface pressing the protrusion part on the end of the side wall part, at least a part of a side surface of the joining member being exposed to an exterior, wherein
   the body includes a groove formed on the non-pressing surface of the side wall part.

2. The toilet seat according to claim 1, wherein:
   the bottom plate includes an extension part extending laterally along a bottom surface of the bottom plate part; and
   the joining member closely contacting the non-pressing surface of the side wall part, the side surface of the bottom plate part, and a surface other than a surface along the bottom surface of the bottom plate part on the extension part.

3. The toilet seat according to claim 2, wherein the extension part is formed in such a manner that a thickness of the extension part is reduced toward a distal end of the extension part.

4. The toilet seat according to claim 1, wherein:
   the side wall part and the bottom plate part are formed in such a manner that an inner wall of the side wall part and an outer peripheral wall of the bottom plate part are pressed by and contact one another; and
   the body and the bottom plate are configured in such a manner that the joining member does not flow into a space defined by the body and the bottom plate.

* * * * *